(No Model.)
R. COX.
HARROW.
No. 350,295. Patented Oct. 5, 1886.
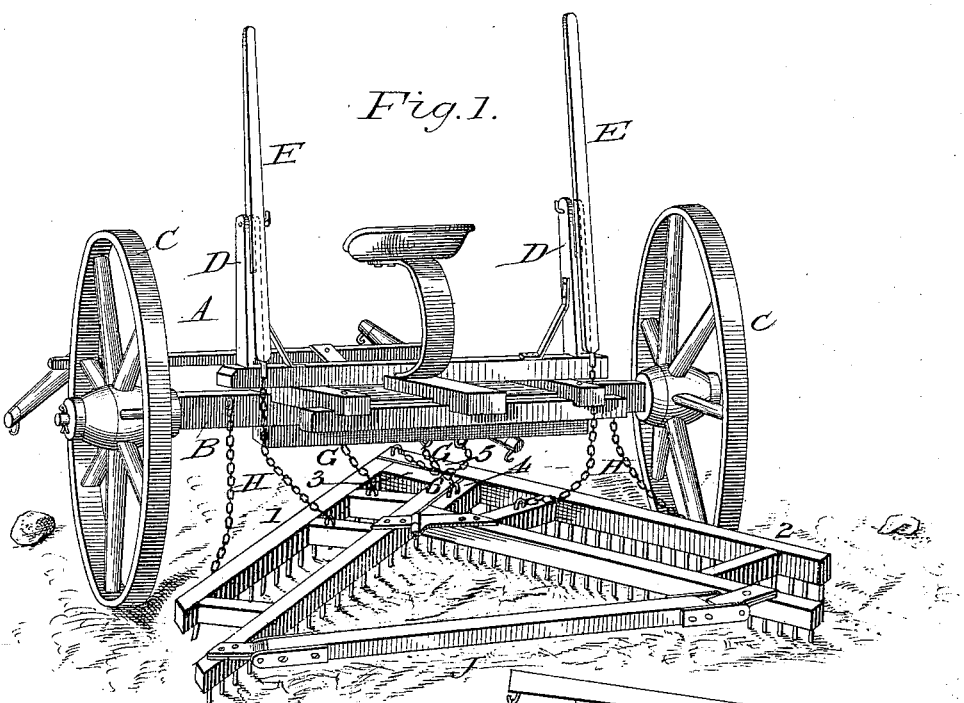
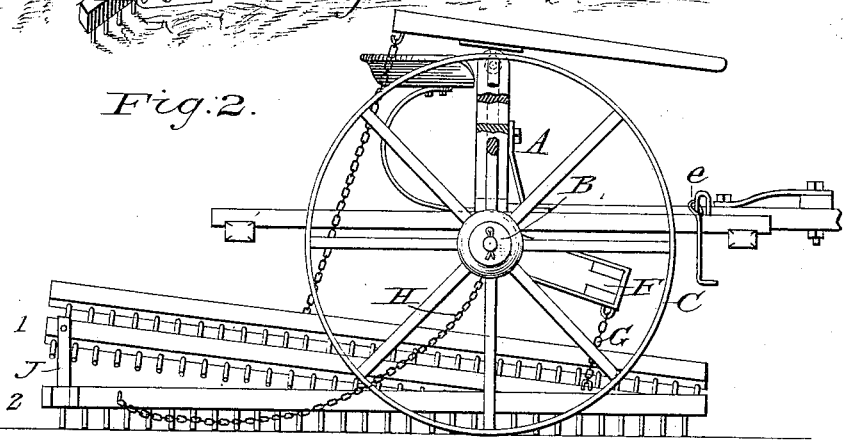
Witnesses:
F. J. Keller
Wm Kinkaid
Inventor.
Riley Cox

UNITED STATES PATENT OFFICE.

RILEY COX, OF BOISE CITY, IDAHO TERRITORY.

HARROW.

SPECIFICATION forming part of Letters Patent No. 350,295, dated October 5, 1886.

Application filed January 8, 1885. Serial No. 152,372. (No model.)

*To all whom it may concern:*

Be it known that I, RILEY COX, a citizen of the United States, and a resident of Boise City, in the county of Ada and Territory of Idaho, have invented a new and useful Harrow, of which the following is a specification.

My invention is an improvement in harrows, and especially in that class of such implements known as "sulky" or "wheel" harrows; and the invention consists in certain features of construction and novel combinations of parts, as will be described.

In the drawings, Figure 1 is a perspective view, and Fig. 2 a side view partly broken away, of a machine constructed according to my invention.

The sulky A has its axle B provided with wheels C, and it is provided with standards D, to which are pivoted between their ends the levers E, for elevating the harrow proper. Hooks e are arranged on the sulky for securing the forward ends of levers E when such ends of the levers are depressed to elevate the harrow.

The sulky is provided with a frame, F, which extends forwardly and inclines downwardly from the axle. The harrow proper is connected to this frame by chains G, which may be secured directly to the frame or be guided by the same and be secured to the axle, as shown in Fig. 2. The chains G connect with the harrow-sections near their forward ends and may be termed the "draft-chains."

Chains H are employed for use in turning the machine, and they connect at one end with the axle and at their opposite ends with the harrow proper near its rear end.

It will be noticed that by the frame F the draft is applied to the harrow low down, thus avoiding any upward draw thereon when in use, and the elevating devices are arranged on the opposite side of the axle from the frame F, so that in elevating the harrow any depression of the sulky-frame in rear of the axle by the weight of the harrow will cause an elevation of the forward end of the frame F, the latter acting as a crank and causing the harrow to rise practically level.

The harrow I is formed of two sections, 1 and 2, which, for convenience of reference, may be termed, respectively, the "first" and "second" sections. The first section has its front bar, 3, arranged diagonally or at an angle to its length. The second section has its front bar or beam 4 arranged at an angle to its length, and is lapped against the forward portion of the inner side bar of section 1. The outer side bar of section 2 is extended forward at 5 and laps against the diagonal front of section 1. The two sections are hinged together at 6, and have their rear ends connected by a bar, J, which latter is hinged to each of the said sections. One of these sections is connected with one of the elevating-levers and the other with the remaining lever, so that either section may be raised to clear it of rubbish, or both may be raised, as in moving the harrow from place to place.

By the peculiar formation of the sections, as described, it will be seen that the forward ends of each are arranged practically in the center of the sulky, and that together in operation they form almost a solid harrow-frame, and by fitting together as shown, one section will in part brace or support the other, as by the diagonal arrangement of the abutting portions of the sections a portion of each rests in rear of a portion of the other.

Having thus described my invention, what I claim as new is—

1. In a sulky-harrow, the combination of the sulky provided with a frame extended forwardly and inclined downward from its axle, the harrow, the connections between said harrow and frame, and means for elevating said harrow with relation to its sulky, substantially as set forth.

2. A harrow comprising a section having its front end bar or beam arranged at an angle to its length, and a second section having its front beam or bar arranged at an angle to its length and lapped against the inner side bar of the first section, and having its outer side bar extended forward and lapped against the front bar or beam of the first section, and a hinge-connection between said sections, substantially as set forth.

3. A harrow formed with two sections fitted and hinged together, one of said sections having its front beam arranged at an angle to the line of draft, and the other section being provided with a beam extended forward and lapped in front of the other section, substantially as set forth.

RILEY COX.

Witnesses:
WM. KINKAID,
J. S. KELLER.